United States Patent
Ulrich et al.

(10) Patent No.: US 11,411,928 B2
(45) Date of Patent: *Aug. 9, 2022

(54) MOBILE DEVICE IDENTIFICATION USING SECOND ENTITY MATCHING

(71) Applicant: ACK Ventures Holdings, LLC, Boca Raton, FL (US)

(72) Inventors: David Ulrich, New York, NY (US); Harry Kargman, New York, NY (US); Steve Anson, Stamford, CT (US); Jeremy Sadwith, Brooklyn, NY (US); Bernhard Valenti, New York, NY (US); Ryan McConville, Brooklyn, NY (US)

(73) Assignee: ACK Ventures Holdings, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,221

(22) Filed: Sep. 14, 2020

(65) Prior Publication Data

US 2021/0058375 A1 Feb. 25, 2021

Related U.S. Application Data

(63) Continuation of application No. 16/416,829, filed on May 20, 2019, now Pat. No. 10,779,164, which is a continuation of application No. 15/912,340, filed on Mar. 5, 2018, now Pat. No. 10,299,125, which is a continuation of application No. 15/236,626, filed on Aug. 15, 2016, now Pat. No. 9,913,141.

(60) Provisional application No. 62/274,639, filed on Jan. 4, 2016, provisional application No. 62/205,193, filed on Aug. 14, 2015.

(51) Int. Cl.
*H04W 12/06* (2021.01)
*H04L 9/40* (2022.01)
*G06F 16/95* (2019.01)
*H04W 12/02* (2009.01)

(52) U.S. Cl.
CPC .......... *H04L 63/0414* (2013.01); *G06F 16/95* (2019.01); *H04L 63/0876* (2013.01); *H04W 12/02* (2013.01); *H04W 12/06* (2013.01)

(58) Field of Classification Search
CPC combination set(s) only.
See application file for complete search history.

(56) References Cited

U.S. PATENT DOCUMENTS

| | | | |
|---|---|---|---|
| 9,913,141 B2 | 3/2018 | Ulrich et al. |
| 10,257,703 B2 | 4/2019 | Ulrich et al. |
| 10,299,125 B2 | 5/2019 | Ulrich et al. |

(Continued)

OTHER PUBLICATIONS

Wikipedia, HTTP ETag. Retrieved online at: http://en.wikipedia.org/wiki/HTTP_ETag. 3 pages. Jan. 31, 2017.

(Continued)

*Primary Examiner* — Phuoc H Doan
(74) *Attorney, Agent, or Firm* — McCarter & English, LLP; John S. Curran

(57) ABSTRACT

An improved technique for identifying a user's mobile device is discussed. A persistent and unified identifier that bridges mobile app to mobile web and to other web browser-compatible mediums is utilized. Using a unique verification identifier, the unified identifier is consistently verified, revived and distributed across application and browser mediums.

20 Claims, 13 Drawing Sheets

(56) References Cited

U.S. PATENT DOCUMENTS

| | | |
|---|---|---|
| 10,779,164 B2 | 9/2020 | Ulrich et al. |
| 2010/0094704 A1 | 4/2010 | Subramanian et al. |
| 2013/0104238 A1* | 4/2013 | Balsan ............... G06Q 30/0207 |
| | | 726/26 |
| 2016/0267523 A1 | 9/2016 | Biswas et al. |

OTHER PUBLICATIONS

U.S. Appl. No. 15/236,626, filed Aug. 15, 2016, U.S. Pat. No. 9,913,141, Issued.
U.S. Appl. No. 15/912,340, filed Mar. 5, 2018, U.S. Pat. No. 10,299,125, Issued.
U.S. Appl. No. 15/912,312, filed Mar. 5, 2018, U.S. Pat. No. 10,257,703, Issued.
U.S. Appl. No. 16/416,829, filed May 20, 2019, U.S. Pat. No. 10,779,164, Issued.

* cited by examiner

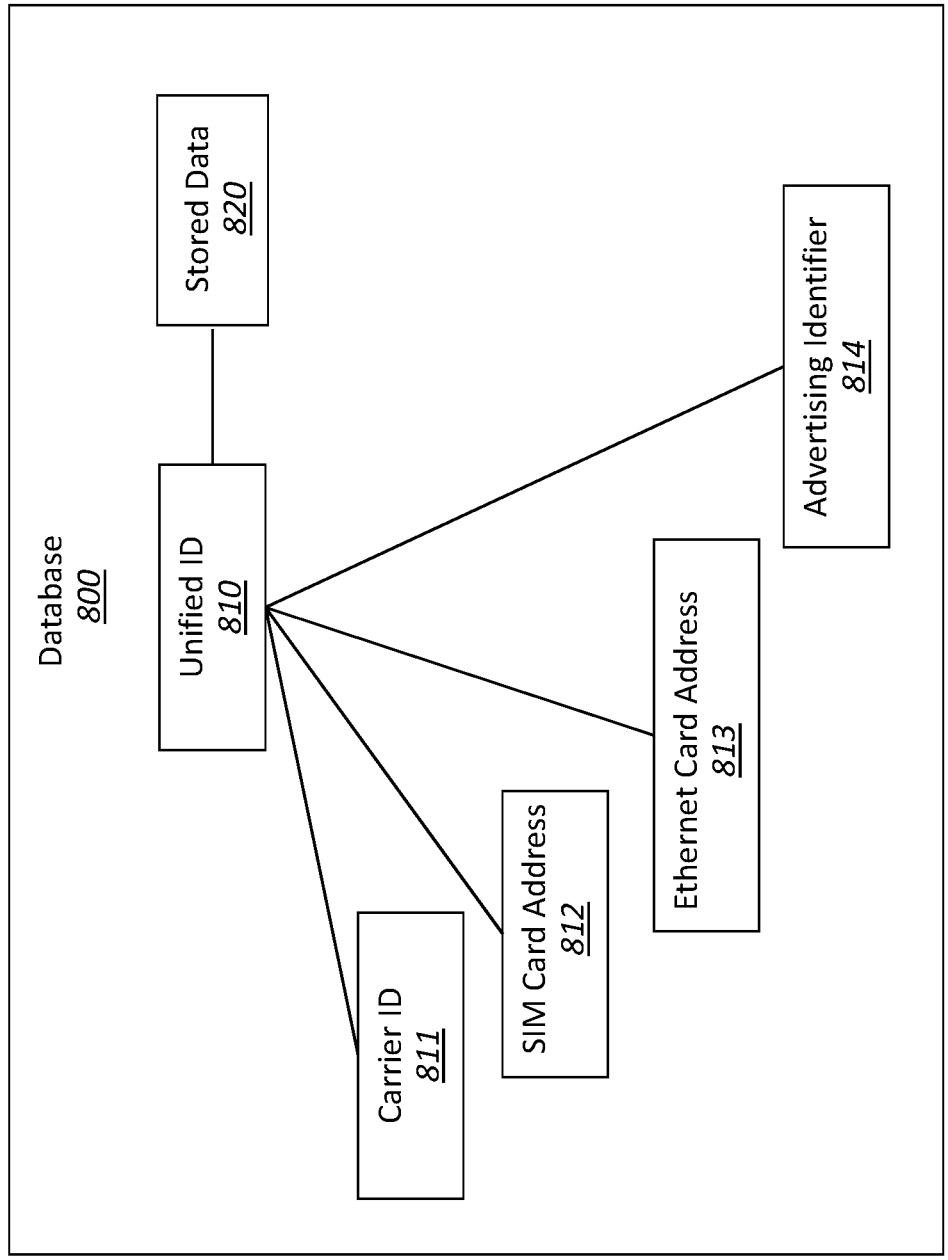

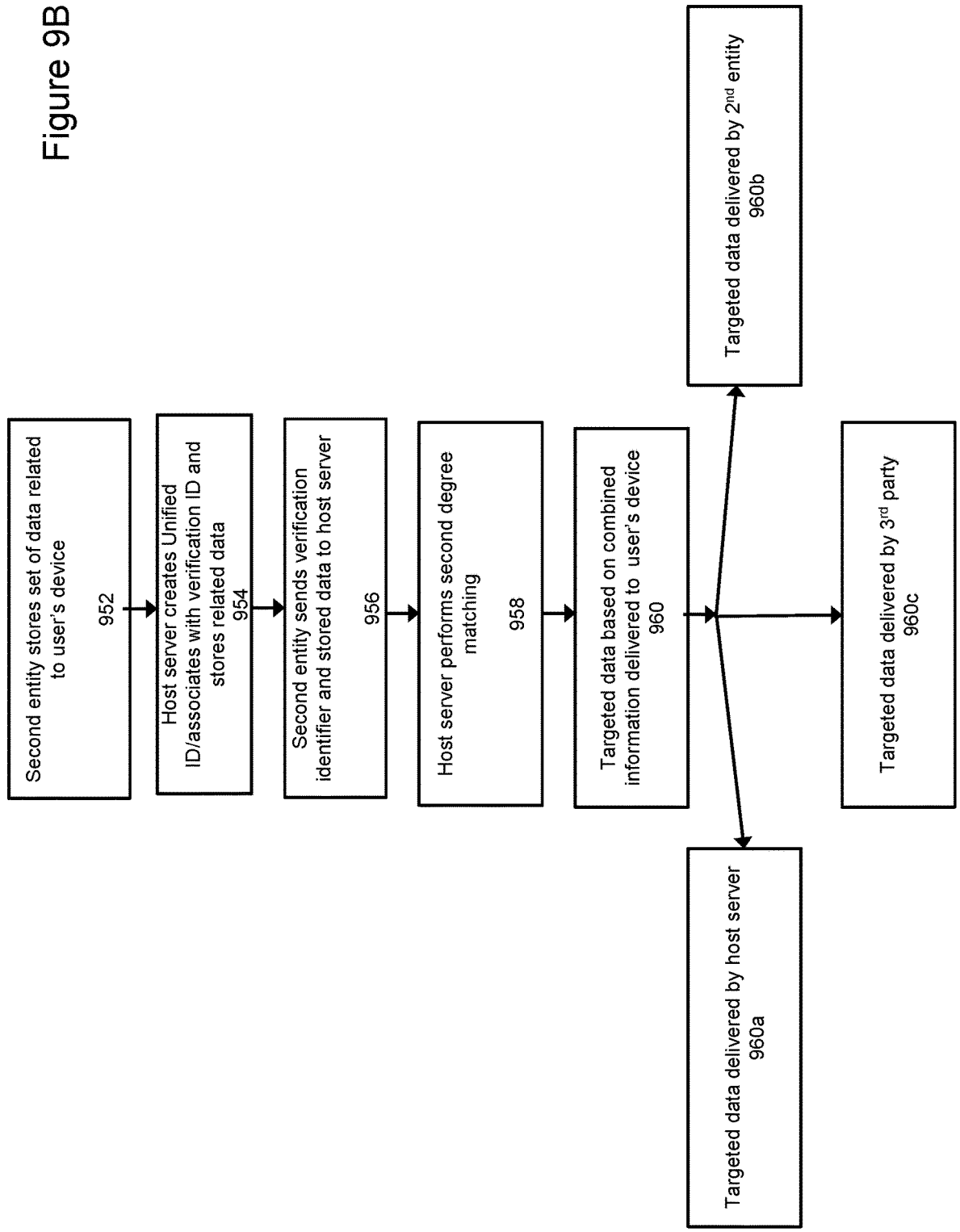

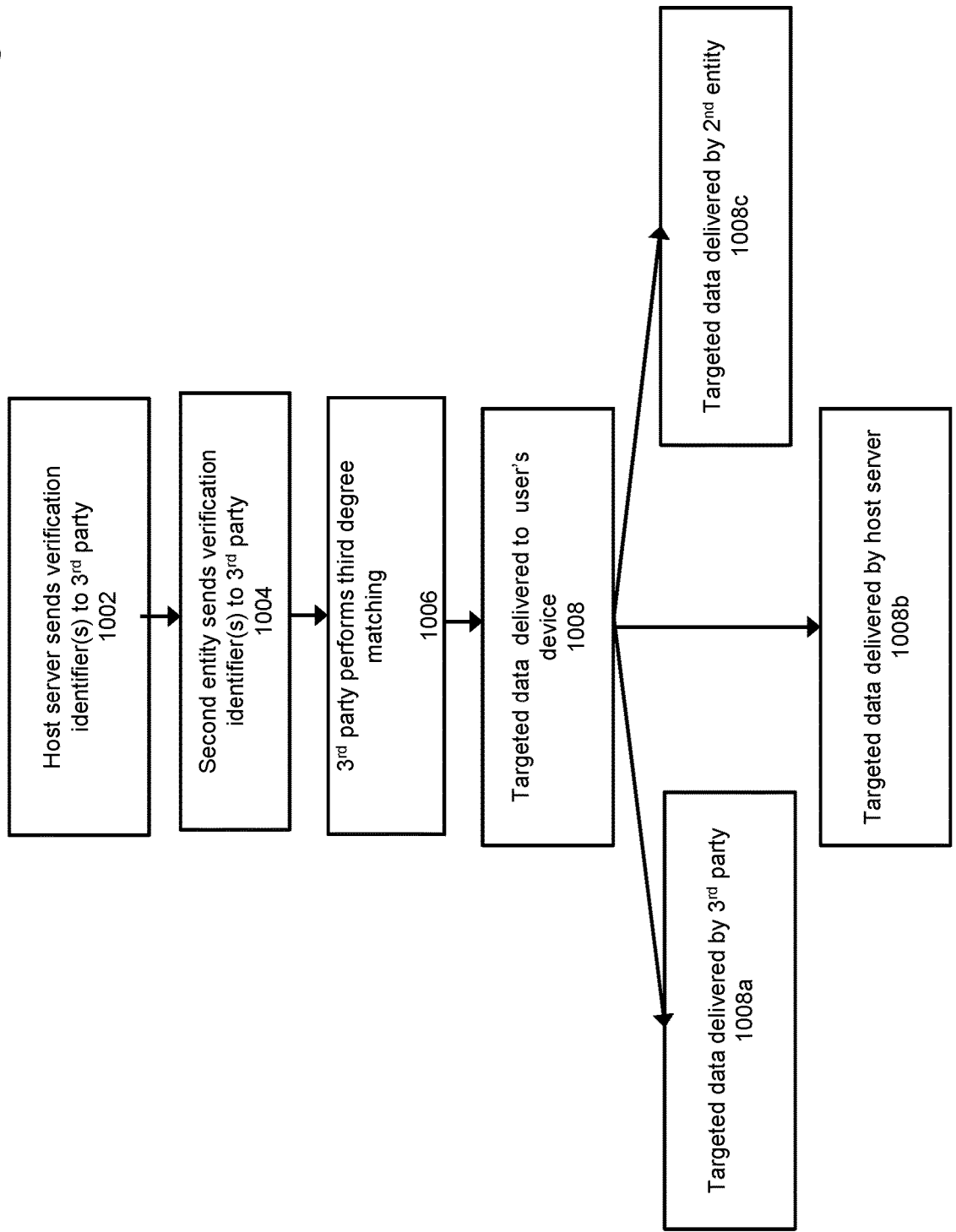

MOBILE DEVICE IDENTIFICATION USING SECOND ENTITY MATCHING

RELATED APPLICATIONS

This application is a continuation of U.S. application Ser. No. 16/416,829, now U.S. Pat. No. 10,779,164, filed May 20, 2019 and entitled "Mobile Device Identification Using Second Entity Matching", which is a continuation of U.S. application Ser. No. 15/912,340, now U.S. Pat. No. 10,299,125, entitled "System and Method for Mobile Device Identification Using Second Entity Matching", filed Mar. 5, 2018, which is a continuation of U.S. application Ser. No. 15/236,626, now U.S. Pat. No. 9,913,141 entitled "System and Method for Improved Identification of a Mobile Device", filed on Aug. 15, 2016, which claims the benefit of, and priority to, U.S. Provisional Patent Application No. 62/205,193, entitled "Persistent Mobile Device ID", filed Aug. 14, 2015, and U.S. Provisional Patent Application No. 62/274,639, entitled "Persistent Mobile Device ID", filed Jan. 4, 2016, the contents of all of the above-referenced applications are incorporated herein in their entirety.

BACKGROUND

Conventional methods of monitoring and tracking a user's mobile device activity may rely on the use of $3^{rd}$ party cookies to identify the device's web site visits. In one example, Web sites visited by the user store small text files called cookies in the web browser of the user's mobile device. These cookies can be used to improve the user's web browsing experience. Cookies can also be used to identify a user's mobile device without relying on personally identifiable information (PII). PII is information that can be used on its own or be combined with other information to identify a specific individual and its use as an identifier raises privacy concerns.

BRIEF SUMMARY

Embodiments of the present invention provide a technique for identifying and tracking activity of a user's device without relying on cookie technology. A unified identifier with improved persistence that bridges mobile app to mobile web and to other web browser-compatible mediums is utilized to identify an individual device. Using a unique verification identifier, such as, but not limited to, a carrier ID, Wi-Fi identifier or other device identifier, the unified identifier is consistently verified, revived and distributed across application and browser mediums including browsers that exist inside downloadable applications. Furthermore, the unified identifier may be used to interconnect mobile to non-mobile platforms through a bridged network of consolidated identifiers. Additionally, the tracking technique of the present invention fully respects the "do-not-track" feature available in newer web browsers.

In one embodiment a method for improved identification of a mobile device includes receiving with a host server a request for a unified identifier ("Unified ID"). The Unified ID is an identifier uniquely identifying the mobile device. The method further includes creating at the host server the Unified ID for a mobile device in response to the request. The method also identifies at the host server a unique first verification identifier for the mobile device and stores the Unified ID and the identified first verification identifier in a storage location. The stored Unified ID is associated with the stored first verification identifier in the storage location. The method additionally transmits the Unified ID from the host server to the mobile device for storage on the mobile device.

In another embodiment a computing device for improved identification of a mobile device includes a communication interface configured to receive over a network requests originating from a mobile device. The computing device also includes a processor configured to execute instructions that include a verification module. When executed, the verification module causes the computing device to receive a request for a unified identifier. The Unified ID is an identifier uniquely identifying the mobile device. Additionally, the verification module when executed causes the computing device to create the Unified ID for the mobile device in response to the request and identify a unique first verification identifier for the mobile device. Further, the verification module when executed causes the computing device to store the Unified ID and the identified first verification identifier in a storage location. The stored Unified ID is associated with the first verification identifier in the storage location. The execution of the verification module also causes the computing device to transmit the Unified ID to the mobile device for storage on the mobile device.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 8 depicts an exemplary chained relationship of identifiers stored in a database holding a Unified ID in an embodiment of the present invention;

FIG. 9B depicts another exemplary sequence of steps executed to perform second degree matching in an embodiment of the present invention;

FIG. 10A depicts an exemplary sequence of steps executed to perform third degree matching in an embodiment of the present invention;

DETAILED DESCRIPTION

Figure 1:
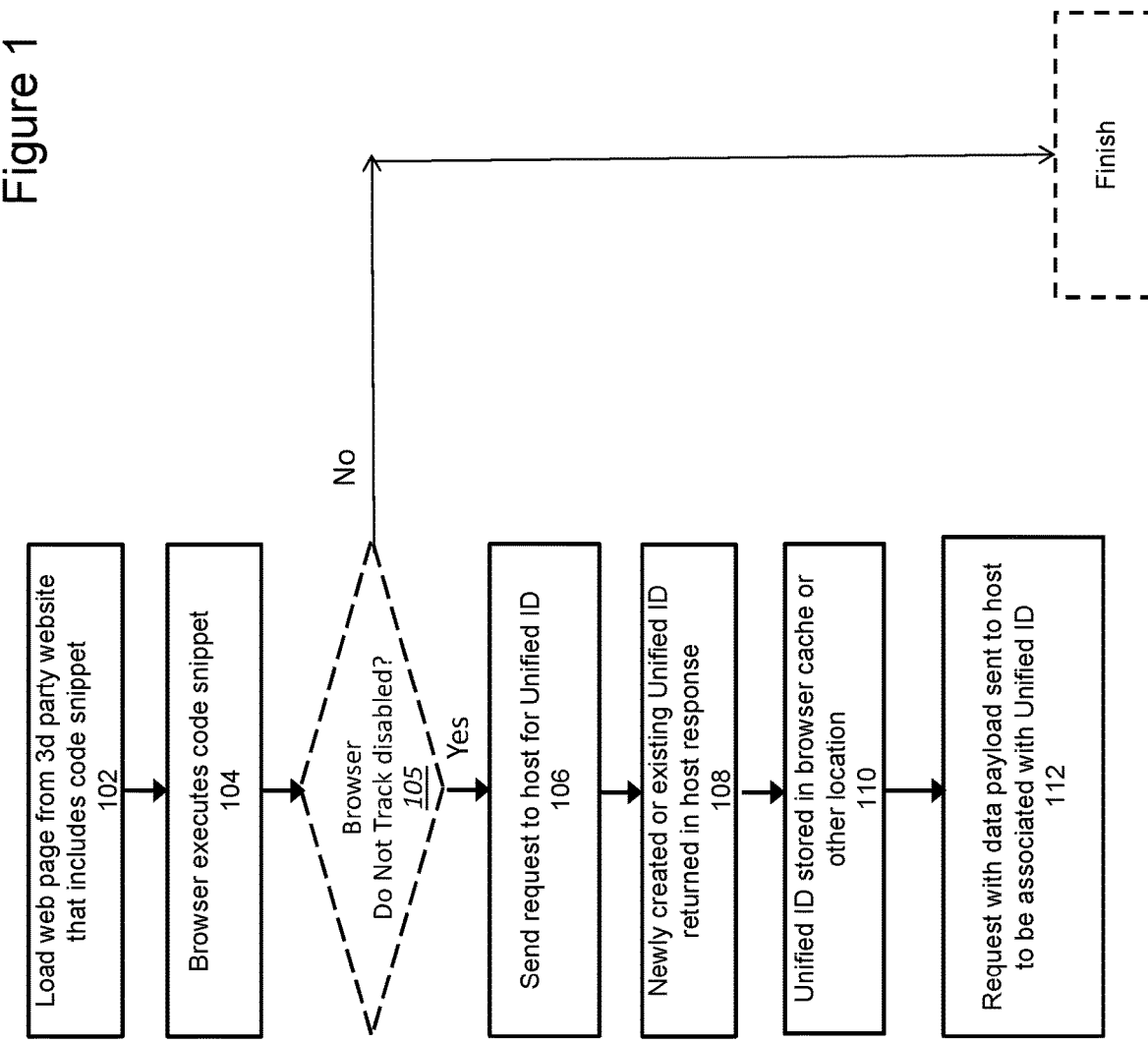
FIG. 1 depicts an exemplary sequence of steps performed by a mobile device to request a Unified ID in an embodiment of the present invention.

While cookies can be used to identify a user's mobile device without relying on personally identifiable information, some browsers are configured not to accept $3^{rd}$ party cookies or to delete them at the end of a user's web browsing session. For example, Safari®, which is a web browser installed on Apple® mobile devices which currently constitute a large portion of the mobile device market, does not accept $3^{rd}$ party cookies by default. Without the ability to definitively rely on $3^{rd}$ party cookies to identify the device, many conventional mobile device monitoring techniques are forced to rely on probabilistic methods of determining device identity. For example, device identity may be guessed based on the number of requests originating from a particular Internet Protocol (IP) address and particular networks. By their very nature, these probabilistic methods of identifying a user's device produce results containing undesirable degrees of uncertainty.

Embodiments of the present invention use one or more unique verification identifiers, such as, but not limited to, a carrier ID or device ID, together with an alias ID that acts as a unified identifier with improved persistence that is applicable across various applications and is utilized to identify a user's mobile or other device. For example, the verification identifier may be retrieved directly by the host server from an HTTP header in a request received by the host server or identified indirectly by the server using a $3^{rd}$ party API to furnish the HTTP header. Non-PII data may be associated with a user (or more particularly to a user's mobile device) that is using an alias ID that leaves the device and its user identifiable without revealing their actual identity. The alias ID utilized by embodiments of the present invention is assigned by a host server and is referred to herein as a "Unified ID". To prevent duplication of Unified IDs or fraudulent use of the Unified ID, an external verification process may be performed by the host server to both unify device data under one singular identifier and restore previously used Unified IDs that were removed from the user's device.

In an embodiment, the Unified ID is stored by a host server in a storage location such as, but not limited to, a database table, as well as being available on a user's device. For example the Unified ID may be stored in a web browser cache on the user's device in the form of an Entity Tag (ETag). It should be appreciated that the term "web browser" as used herein may refer to a stand-alone web browser such as Apple's Safari® web browser, may refer to a browser that exists inside a downloadable application ("in-app browser"), or may refer to another type of software process offering browser-like functionality. ETags are discussed further below. In some embodiments, a verification identifier may be identified through an external source that includes an external authentication mechanism or through publicly available Hyper-Text Transfer Protocol (HTTP) response headers. Embodiments may provide two levels of authentication: a synchronization of the host and client Unified ID and the acquisition of the verification identifier.

FIG. 1 depicts an exemplary sequence of steps performed by a mobile device to request a Unified ID in an embodiment of the present invention. The sequence begins when a web browser on the user's mobile device loads a web page from a $3^{rd}$ party website. The web page includes a code snippet that when executed directs the browser to request a Unified ID from a host server (step 102). In one embodiment, a JavaScript code snippet that is inserted in the loaded web page is executed. For example, the code snippet may be placed within an advertising code snippet. When the web browser executes the code snippet (step 104), a series of functions, both client-side and by the requested host, are triggered that attempt to match both a Unified ID and a verification identifier. In one embodiment, the attempt to match the Unified ID and verification identifier may only occur after an initial determination that the browser's do not track setting is disabled (step 105). If the "do not track" setting is enabled, the code snippet will exit all operation and no verification requests will be made. If the "do not track" setting is disabled (step 105), the execution of the code snippet sequence continues and the browser sends a request to the host server for a Unified ID (step 106). In one embodiment, the request for the Unified ID is an Asynchronous JavaScript and XML (AJAX) request. In another embodiment the request is a JavaScript Object Notation (JSON) request. The host server handles the request in the manner discussed below with respect to FIG. 2 and returns a Unified ID in the response to the request (step 108). For example, the Unified ID may be returned in the form of an ETag in the response to the request. The ETag is an HTTP response header used as a method of storing the Unified ID that remains persistent, until cleared, in the mobile device's web browser cache. In one embodiment, the Unified ID may be formed from a hash of a random number assigned by the host server. In another embodiment, the Unified ID may be some other number assigned by the host server. The Unified ID being returned may be newly created in response to the request for a Unified ID or may be a pre-existing Unified ID previously associated with the mobile device that is retrieved by the host server. The returned Unified ID may be stored in the browser cache (step 110) and provides an identifier with improved persistence for the mobile device. As noted above, a copy of the Unified ID is stored by the host server as well as being stored on the mobile device. Future requests from the mobile device to the host server may contain a copy of the Unified ID. It should be appreciated that although some of the discussion herein focuses on the use of an ETag being returned in the request to the response, other forms of storing persistent identifiers could be used instead of an ETag without departing from the scope of the present invention and that references to the use of ETags herein should be considered to also illustrate the use of other persistent identifiers. Following receipt of the Unified ID, an additional request may be sent by the mobile device to the host server that contains the Unified ID and payload data to be attributed to the Unified ID (step 112). In one embodiment, the payload data may include non-PII content, such as advertising segment data or other campaign-specific data, as well as an indicator of whether or not a verification identifier was previously matched.

Figure 2:
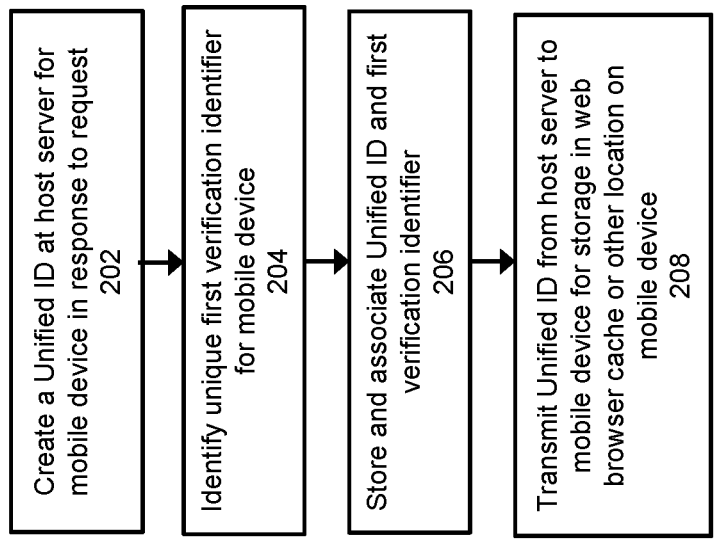
FIG. 2 depicts an exemplary sequence of steps performed by a host server to create a Unified ID for a mobile device in an embodiment of the present invention

An exemplary sequence of steps performed by a host server to create a Unified ID for a mobile device in an embodiment of the present invention is depicted in FIG. 2. The sequence begins with the host server creating a Unified ID for a requesting mobile device in response to a request received from a mobile device (step 202). As discussed above, this request may be automatically triggered by a client browser executing code in a web page. A verification module on the host server attempts to identify a unique first verification identifier for the mobile device (step 204). This first verification identifier may be contained in the HTTP header of the request or may be otherwise obtained by the verification module. Additional types of verification identifiers are discussed further below. The verification module stores the created Unified ID and the first verification identifier, if one was identified at the time of the creation of the Unified ID, in a database or other storage location accessible to the host server. An association between the Unified ID and the unique first verification identifier of the mobile device is also stored in the database (step 206). If the first verification identifier is not initially identified, it may be identified later during a subsequent communication with the host server and associated with the Unified ID in the database or other location at that time. As explained further below, additional unique verification identifiers for the mobile device may also be associated with the Unified ID in storage, either at the same time or subsequently if identified later. The created Unified ID is then forwarded to the mobile device from the host server in the form of an ETag or other form for storage in the web browser cache or other location on the mobile device (step 208).

In one embodiment, the handling of the received request for a Unified ID by the host server varies depending on whether or not the requesting mobile device has already been assigned a Unified ID. To assist a verification module in making the determination, the request for a Unified ID may use an "if-none-match" HTTP header in the request which may or may not include a Unified ID as part of the request header. There may be a number of reasons why a Unified ID is not included in the header of the request. For instance, the request may be the first from the mobile device to the host server so that the mobile device has not yet been assigned a Unified ID. The mobile device may also have flushed its browser cache so that the local copy of the Unified ID is not available. If the host server receives a request without a Unified ID, the verification module may seek to determine whether the Unified ID is missing or has not yet been assigned to the mobile device. A verification identifier for the requesting mobile device is identified and used in processing the request for the Unified ID. As noted above, the verification identifier may be a carrier ID and may be retrieved directly by the host server from an HTTP header in a request received by the host server (if the mobile device is communicating via a cellular network). The carrier ID may also come in the form of a normalized ID from a third party aggregator. For example, in one embodiment, the third party aggregator may take separate carrier IDs (such as those provided by T-Mobile™, Sprint™, Verizon™ and AT&T™) and provide an alpha-numeric representation of the ID. Alternatively, the verification identifier may be retrieved indirectly by the server by making an additional request to a Mobile Network Operator (MNO) via a $3^{rd}$ party API to provide a carrier ID. In the case of an MNO, rather than the carrier furnishing the traffic between the mobile device and the host server, a request may be made to a third party to host the verification process to act as an intermediary. The third party verifier intercepts the traffic from the mobile device to the host server, appends the carrier ID, then forwards the original traffic (containing the Unified ID if available) to the server. It should be noted that this attempt to retrieve a verification identifier from the MNO will only be successful if the user's phone is communicating over a cellular network and not communicating via Wi-Fi. If a verification identifier cannot be retrieved, the verification module uses a current or newly created Unified ID which can be stored. Once the verification identifier for the mobile device has been identified, the host server checks a database or other storage location to which it has access to see if that verification identifier is stored and associated with a Unified ID for the requesting mobile device. If the verification identifier has not been previously saved, the verification module determines that the requesting device has not previously been assigned a Unified ID. In such a case, a Unified ID is created for the mobile device and transmitted to the mobile device in the form of an ETag or other persistent device identifier. A copy of the created Unified ID is saved by the host server and linked with the verification identifier which is also saved. Alternatively, if the check of the database finds the verification identifier and an associated Unified ID, the Unified ID may be retrieved from storage and returned to the mobile device in the form of an ETag or other persistent device identifier to be stored in the mobile device's browser cache or other location on the mobile device. As a third possibility, the original "if-none-match" request to the host server may include a Unified ID provided by the mobile device. In such a case, the legitimacy of the Unified ID accompanying the request is verified using the verification identifier to retrieve the Unified ID linked to the verification identifier by the host server which is then compared to the retrieved Unified ID that accompanied the request. It should be appreciated, that alternate request mechanisms, not relying specifically on "if-none-match" requests, are also within the scope of the present invention.

Figure 3:
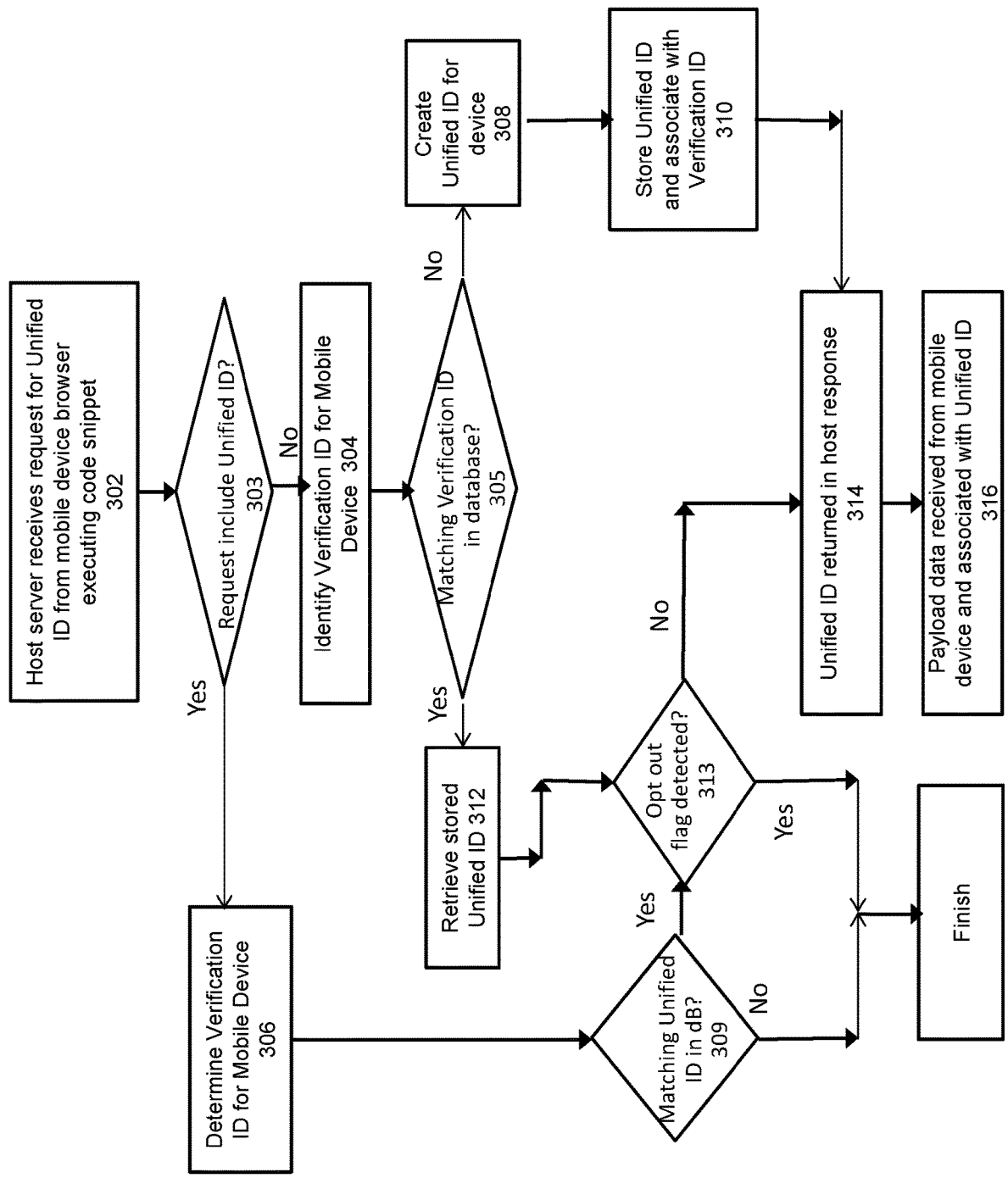
FIG. 3 depicts an exemplary sequence of steps performed by a host server to handle a request for, and verify, a Unified ID for a user's mobile device and to associate non-PII data to a Unified ID in an embodiment of the present invention.

An exemplary processing sequence performed by the host server in response to the receipt of a request for a Unified ID in an embodiment is depicted in FIG. 3. The sequence begins with the host server receiving a request for a Unified ID from the mobile device browser executing the code snippet embedded in the loaded 3rd party web page as discussed above (step 302). As also discussed above, the request may be in the form of an HTTP request including an "if-none-match" header. A verification module executing on the host server processes the request and first seeks to determine whether there is a Unified ID already assigned to the requesting mobile device. To make this determination, the request is examined to determine whether it contains a Unified ID (step 303). If the request does not contain a Unified ID, a verification identifier, such as a carrier ID or device ID, is determined for the requesting device as described above (step 304). Once the verification identifier for the requesting device is determined, the verification module checks a database or other storage location for the verification identifier's presence (step 305). If a saved copy of the verification identifier does not exist (step 305), the verification module determines that the requesting mobile device has not previously been assigned a Unified ID and a new Unified ID is created for the requesting device (step 308). For example, a random number for the requesting device may be assigned by the server and the Unified ID may be formed by hashing the random number. The verification identifier and its association to the created Unified ID are stored in the database or other location by the host server (step 310). The created Unified ID in the form of an ETag or other persistent device identifier is then returned to the requesting device (step 314).

If a matching verification identifier for the requesting device is present in the database or other location (step 305), and the request does not include a Unified ID, the previously stored Unified ID associated with the verification identifier for the mobile device is identified and retrieved from storage (step 312). For example, this situation may occur in the event the mobile device manually deletes its Unified ID but then makes a subsequent request to the host server. The carrier ID, device ID or other verification identifier that has been saved and associated with a Unified ID can be used to verify the identity of the requesting mobile device and restore the Unified ID. The verification module executing on the host server may check for an "opt-out" flag in the database (step 313) to see if the mobile device has previously affirmatively opted out of its activity being monitored. If this flag is present, the system may return an HTTP/1.1 200 OK response with an "opt-out" error and no further action is taken. If the opt-out flag is not set, the Unified ID is returned to the requesting mobile device (step 314).

If the request received by the host server includes a Unified ID in the header or otherwise accompanying the request (step 303), the legitimacy of the Unified ID may be verified to determine whether it is associated with the requesting mobile device (i.e. to make sure the Unified ID has not been fraudulently transferred to a different device). To verify the Unified ID, a verification identifier for the mobile device is determined (step 306) and a database query is executed to see if the stored verification identifier for the requesting device is associated with the same Unified ID (step 309). If the Unified ID is not verified, depending on implementation, the verification module may return the unverified Unified ID to the requesting device (step 314) treat the requesting device as if it had never been assigned a Unified ID and instead create a Unified ID for return to the mobile device (step 308), or end by returning an error message. If the Unified ID is verified, the host system may check for an "opt-out" flag in the database (step 313) to see if the mobile device has previously affirmatively opted out of its activity being monitored. If this flag is present, the system may return an HTTP/1.1 200 OK response with an "opt-out" error and no further action is taken. If the opt-out flag is not set, the Unified ID is returned to the requesting mobile device (step 314).

Once returned to the mobile device (step 314) the Unified ID remains persisted in the client's web browser cache (or other storage location on the client) unless cleared. In one embodiment, additional parameters accompanying the Unified ID may also be returned to the requesting device. For instance, a flag indicating that a future verification request should not be made in order to reduce the number of network requests may be returned with the Unified ID. After sending confirmation of a Unified ID (or providing a Unified ID) to the client/mobile device, a second request containing payload data may be received by the designated host from the mobile device (step 316). This payload may include non-PII content, such as advertising segment data or other campaign-specific data from the mobile device browser, as well as an indicator of whether or not a verification identifier was matched. The non-PII content and indicator may then be associated with the Unified ID stored on the host server. If a verification identifier was matched and stored in the database with the Unified ID, the process may set a cookie to forego requesting another verification identifier to match with the Unified ID on subsequent requests. If the process was unable to match the verification identifier, the cookie may not be set and future requests to the host for the Unified ID may attempt to match a verification identifier.

In one embodiment, when the host server receives the data payload (step 316), an additional check may be made to ensure that the client has not opted out of the system. If the client has opted out, no data is stored and the process exits. Otherwise, the data is attributed to the Unified ID and stored in the database. If successful, a 200 OK status may be returned to the client.

Figure 4:
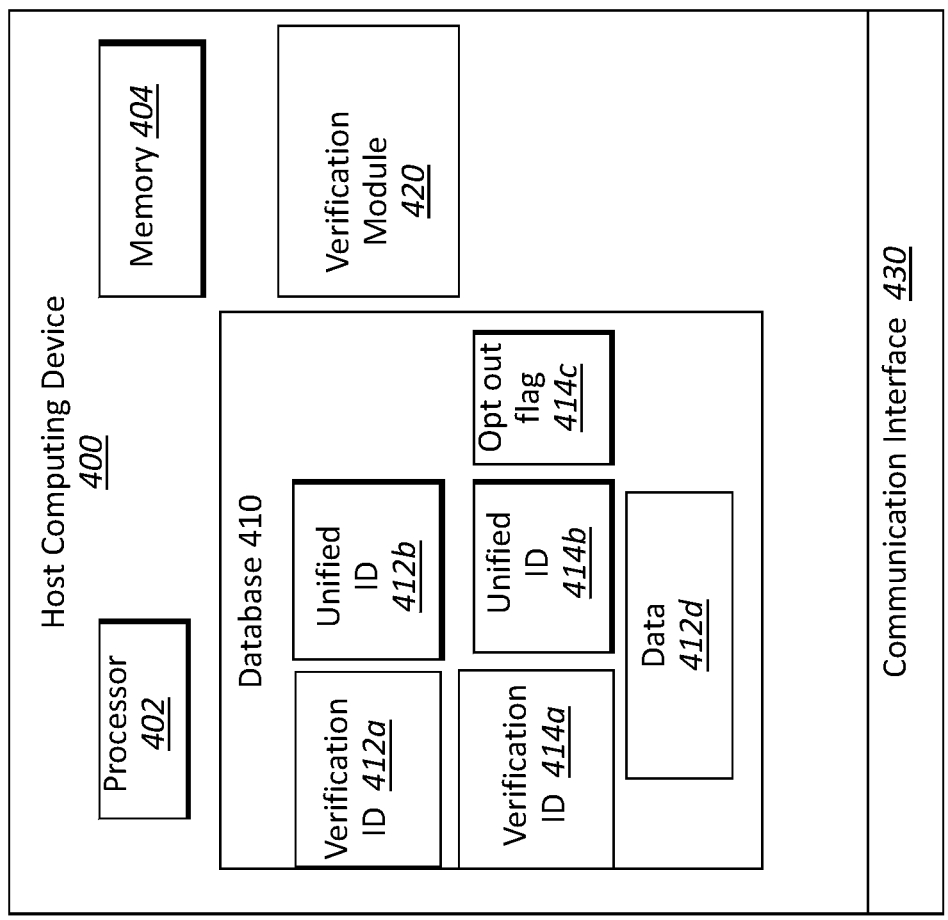
FIG. 4 depicts an exemplary host computing device suitable for use by an embodiment of the present invention.

FIG. 4 depicts an exemplary host computing device suitable for use by an embodiment of the present invention. A host computing device 400, such as a host server, includes one or more processors 402 such as CPUs and memory 404. Memory 404 may include Read Only Memory (ROM) and Random Access Memory (RAM). Host computing device 400 also includes communication interface 430 suitable for communicating over a network with a requesting device. Host computing device 400 may also include, or have access to, database 410. Database 410 holds information related to mobile or other devices. More particularly, database 410 includes verification identifiers 412a and 414a respectively associated with Unified IDs 412b and 414b. In another embodiment, instead of returning the actual Unified ID to the mobile device, the host server may return a representation of the Unified ID such as a hash or other altered value and associate the returned altered value with the actual Unified ID in database 410. Database 410 may also include opt-out flag 414c indicating that the mobile or other requesting device with which the verification identifier 414a and Unified ID 414b are associated has opted out of having its activities monitored by host computing device 400. Database 410 may also hold data 412d that is associated with the requesting device associated with verification identifier 412a and Unified ID 412b. The data may be payload data received from the requesting device or additional data associated with the requesting device. In contrast, because the requesting device associated with verification identifier 414a and Unified ID 414b has a set opt out flag 414c, data is not stored in database 410 for that requesting device. Host computing device 400 also includes and executes verification module 420 for processing requests for Unified IDs received from mobile and other devices as described herein. Host computing device 400 may be a server, desktop computing device, tablet computing device, laptop or some type of other electronic device equipped with a processor that is able to execute verification module 420 as described herein. Verification module 420 may include various circuits, circuitry and one or more software components, programs, applications, or other units of code base or instructions configured to be executed by one or more processors such as processor 402 included in host computing device 400. Although verification module 420 is shown as a single distinct module in FIG. 4, it should be understood that the verification module may be implemented as multiple modules in place of the single module illustrated.

Figure 5:
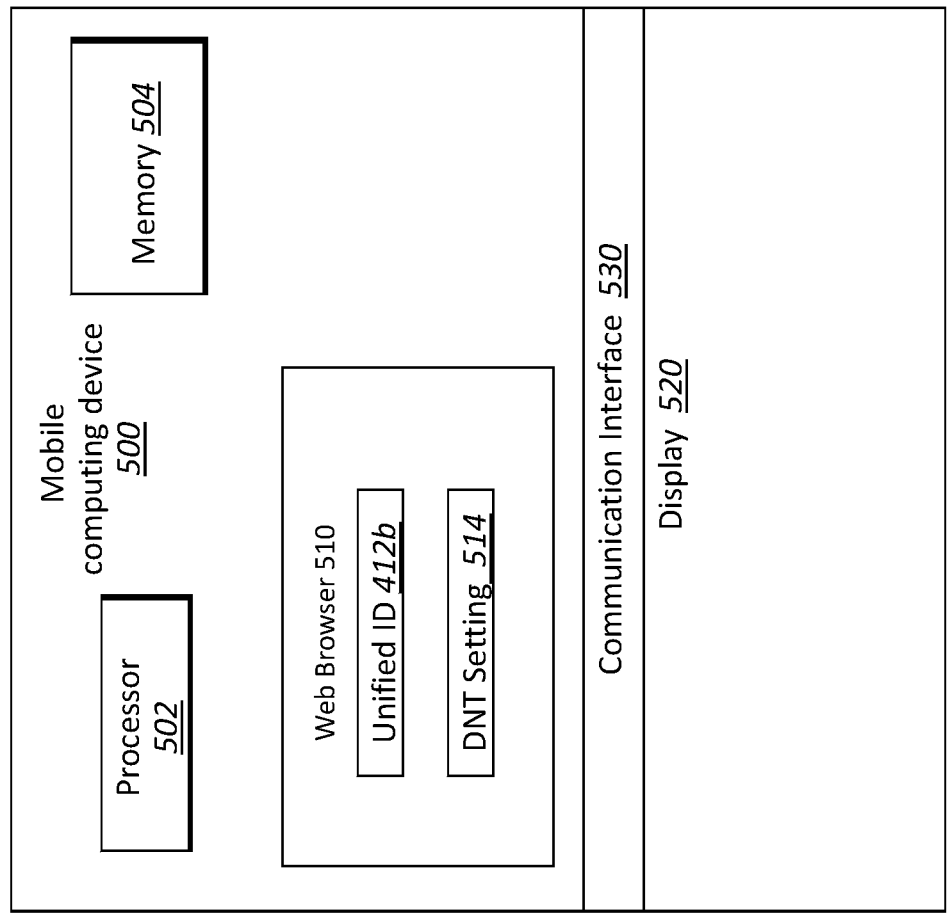
FIG. 5 depicts an exemplary mobile device suitable for use by an embodiment of the present invention.

FIG. 5 depicts an exemplary mobile device suitable for use by an embodiment of the present invention. Mobile computing device 500 may include one or more processors 502 and memory 504. Memory 504 may include Read Only Memory (ROM) and Random Access Memory (RAM). Mobile computing device 500 also includes communication interface 530 suitable for communicating over a network such as a voice or data network. Mobile computing device 500 may include web browser 510. Web browser 510 may store Unified ID 412b and a "do not track" setting 514 that is not enabled so that the identity and activities of mobile computing device 500 may be tracked by host computing device 400. Mobile computing device 500 may also include display 520. Display 520 may be integrated into mobile computing device 500 or in communication with mobile computing device. Mobile computing device 500 may be a cell phone, smartphone, laptop, tablet or other mobile electronic device equipped with a processor and able to communicate with host computing device 400.

Figure 6:
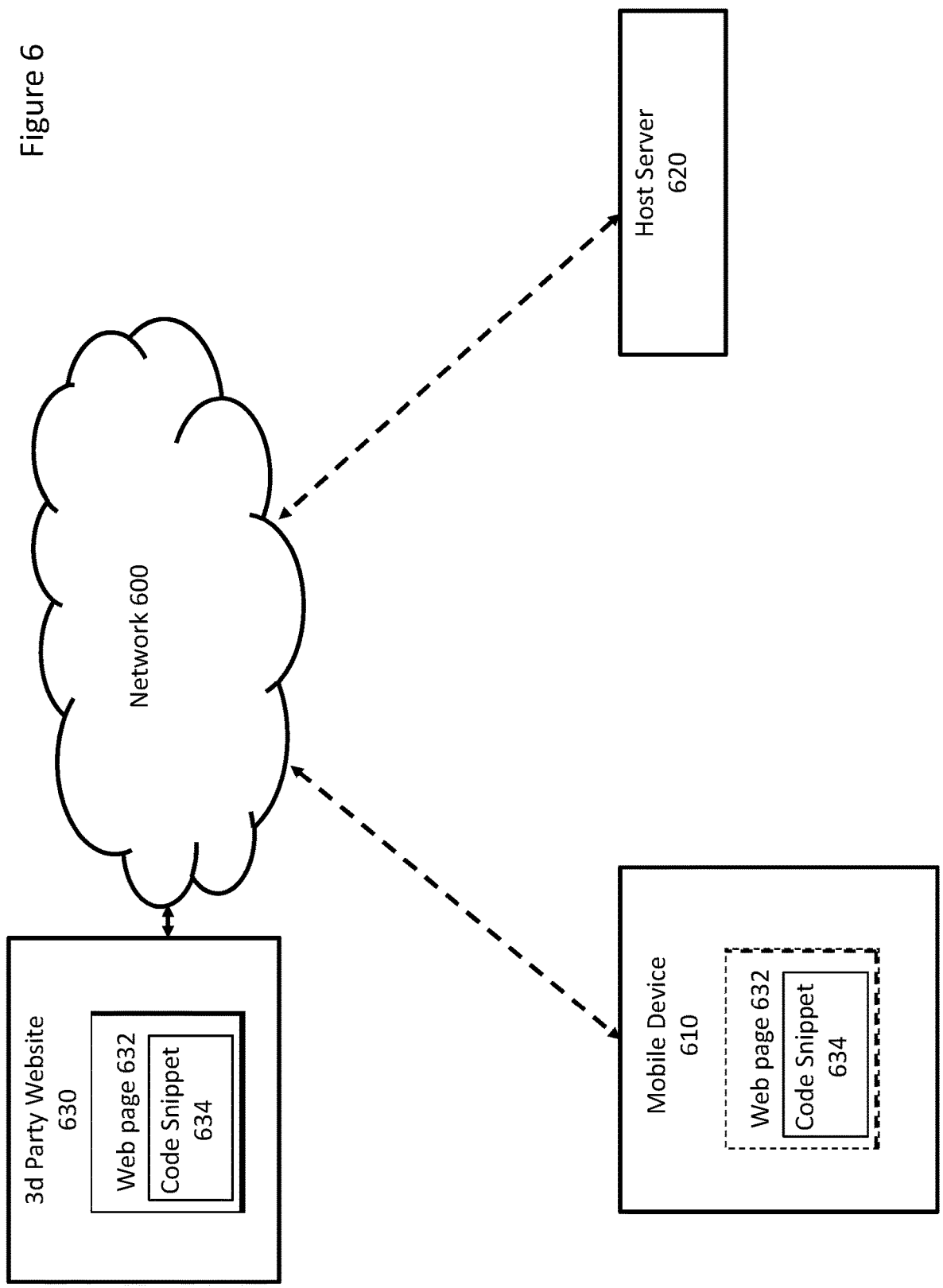
FIG. 6 depicts an exemplary environment suitable for practicing an embodiment of the present invention.

FIG. 6 depicts an exemplary environment suitable for practicing an embodiment of the present invention. A requesting device such as mobile device 610 may download web page 632 from $3^{rd}$ party website 630 over network 600. A browser on mobile device 610 may execute code snippet 634 after loading web page 632. The execution of code snippet 634 triggers a request to host server 620 for a Unified ID. After receiving the Unified ID (or having an existing Unified ID validated), payload data accompanied by the Unified ID may be sent from mobile device 610 to host server 620 for storage in a database with the stored data being associated with the Unified ID. Network 600 may be any type of network including, without limitation, the Internet, a cellular network, a local area network (LAN) and an intranet. As mentioned previously, in another embodiment, a non-mobile computing device (not shown) may take the place of mobile device 610 and request a Unified ID.

As noted above, current conventional methods of tracking mobile device activity are probabilistic rather than deterministic which results in a degree of uncertainty even in the most accurate probabilistic systems. To lessen the amount of uncertainty, embodiments of the present invention use a Unified ID with improved persistence that provides near-deterministic results in certain cases. The use of this Unified ID relies on a verification identifier as described herein. For ease of explanation, much of the above description has focused on the use of a carrier ID as a single verification identifier used to validate the Unified ID. However, it should be appreciated that almost every mobile and non-mobile device has multiple non-duplicative deterministic identifiers such as, but not limited to, a carrier ID, a device ID, a SIM card address, a cookie, an Ethernet card address, an advertising identifier such as (IDFA™ or GoogleID®), etc. that may be used as verification identifiers. Each of these identifiers has varying degrees of persistence meaning that they are all unique to that device but they may disappear unexpectedly or be replaced. Accordingly, embodiments of the present invention may use multiple deterministic identifiers as verification identifiers for a single device.

It should be appreciated that the verification module on the host server retrieves and identifies the different types of verification identifiers using different techniques depending upon which type of verification identifier is being retrieved from the device requesting the Unified ID. Some retrieval techniques will depend upon device characteristics. For example, some techniques may work with Android®-based devices but not with Apple®-based devices and vice-versa because of limitations as to what information each device makes available. Carrier ID retrieval by the host server has been discussed above. In one embodiment, to retrieve hardware-related verification identifiers such as device IDs, MAC addresses, advertising identifiers, Bluetooth™ addresses, etc., the host server may make use of an API in a Software Development Kit (SDK) to retrieve the verification identifier using functions the requesting device platform has made available. Other verification identifiers may be retrieved using other identifier-appropriate techniques. In an embodiment, the carrier ID may be used to bind the retrieved verification identifier to the Unified ID. In another embodiment, the verification identifier can also include anonymized or hashed data such as a phone number, email address, physical address or other static non-digital means of identification. In such a case, the data stored by the host server is non-PII in nature.

In one embodiment, given the varying degrees of persistence, the host server seeks to link all available verification identifiers together into a chain under a master identifier—the Unified ID. The goal of having a Unified ID is to achieve improved persistence and using a single ID would inevitably provide the possibility of a break in that persistence from time to time. In a preferred embodiment, multiple verification identifiers are linked to the Unified ID so that in the event one verification identifier is unavailable a second verification identifier may be used to verify the Unified ID instead. Further, by creating a chain of different verification identifiers for a particular device, the Unified ID will be able to reconnect the new verification identifier with that of the old one, thus maintaining the history of the device (and its user). The host server seeks to create a daisy chain of unique verification identifiers. The goal is to find specific device identifiers that are truly unique and link those identifiers to one another—hence creating redundancy if one or more of the identifiers is erased, deleted, replaced (with a new unique identifier) or is otherwise inaccessible. By using transitivity to maintain the persistence and strength of the data set, any identifiers that are replaced may be linked back to their prior version (and hence no historical usage data will be lost for that user). In one example the mobile device may purge one or more of these verification identifiers from time to time. For instance, the SIM card address is unique to a device and the user may need to replace the SIM card because it breaks. When multiple verification identifiers are linked to the Unified ID, another verification identifier can be used to verify the Unified ID and then the new SIM card address can be linked to/replace the old SIM card address thus allowing all the history data for the Unified ID to be kept. Similarly, after the operating system updates, the mobile device may have purged one of the device verification identifiers, but potentially another one may still exist. By using a transitive relationship with a persistent identifier, the data associated with the prior purged verification identifier will be connected to the newly created verification identifier (created in the update). In essence, the information associated with the Unified ID will remain persistent before and after the update (as an example using the persistent carrier ID to connect the old identifier with the newly formed verification identifier). This methodology reinforces the reliability that not only is a particular device's Unified ID authenticated and guaranteed but that there will not be duplicate entries (or lost data) for the same device due to lack of persistence in any one particular identifier.

It should be appreciated that although the Unified ID is described herein as a singular value tracked by the host server, other implementations are possible within the scope of the present invention. For example when multiple Unified IDs are found to be assigned to the same device, such as occurs in the circumstances discussed further below, rather than consolidating the identifiers by overwriting identifiers to a single Unified ID, the multiple IDs may be linked in the database so that the host server is aware that the different Unified IDs refer to the same device through the transitive property. Thus a Unified ID may be a single ID or may be a linked series of Unified IDs.

Figure 7:
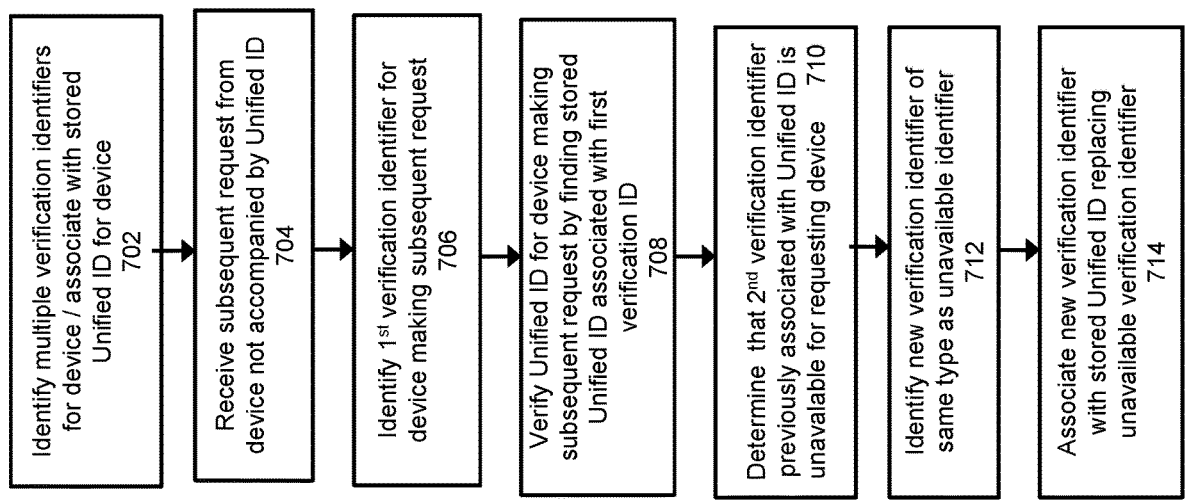
FIG. 7 depicts an exemplary sequence of steps performed by a host server to associate multiple verification identifiers with the same Unified ID and replace an unavailable verification identifier in an embodiment of the present invention.

FIG. 7 depicts an exemplary sequence of steps performed by a host server to associate multiple verification identifiers for a device with the same Unified ID and replace an unavailable verification identifier. The sequence begins with a verification module on the host server identifying multiple types of verification identifiers for a device and associating them with a stored Unified ID (step 702). The device may be a mobile device or non-mobile device. The identifying of the different types of verification identifiers may take place all at once or over time. The identification of the verification identifiers may result from analysis of requests received by the host servers from the requesting device or by queries from the host server to the device or third parties regarding the device. As noted previously, the verification identifiers may be different types of verification identifiers such as, but not limited to, a carrier ID, device ID, SIM card address, cookie, Ethernet card address, or advertising identifiers. The sequence continues with the host server receiving a subsequent request from the device that is not accompanied by a Unified ID (step 704). A first verification identifier (previously associated with the stored Unified ID) is identified for the requesting device (step 706) and used to verify the Unified ID for the device (i.e. by matching the verification ID to the stored Unified ID) (step 708). The host server may then determine that a second verification identifier previously associated with the Unified ID is unavailable (step 710) but that a new verification identifier of the same type is available (step 712). For example, a SIM card may be replaced in a requesting mobile device leading to this situation. The new verification identifier is associated with the stored Unified ID by the host server in place of the unavailable verification identifier (step 714).

FIG. 8 depicts an exemplary chained relationship of identifiers stored in the database holding a Unified ID in an embodiment of the present invention. Database 800 stores a Unified ID 810 previously assigned to a mobile or other requesting device. In this example, Unified ID 810 is associated with four different unique verification identifiers for the mobile device. More particularly, Unified ID 810 is associated with Carrier ID 811, SIM Card Address 812, Ethernet Card Address 813 and advertising identifier 814. With multiple verification identifiers 811, 812, 813 and 814 associated with Unified ID 810, identification of the mobile device can continue even when losing one or more of the verification identifiers. Further, data stored using one verification identifier can be linked through the Unified ID to data stored using a different verification ID. In one embodiment (not shown), the verification identifiers may also be linked with each other in database 800 in addition to being linked to Unified ID 810. It will be appreciated that database 800 will ordinarily hold hundreds or thousands of Unified IDs and their associated verification identifiers and that only a single Unified ID is illustrated herein for ease of description. Embodiments thus provide an improved mechanism for identifying a user's device that is not reliant on client-side storage and is less susceptible to single points of failure should a particular verification identifier become unavailable.

Although the linking of verification identifiers to a Unified ID has been discussed herein in the context of linking one or more verification identifiers to an existing or contemporaneously created Unified ID, it should be appreciated that other actions may be taken by the host server and/or verification module to save data prior to the creation of the Unified ID and later link that data to a Unified ID that are within the scope of the present invention. For example, in an alternate embodiment, the verification identifier for a mobile or other device may be determined that is not requesting a Unified ID and did not previously receive one from the host server. Data associated with the device such as but not limited to a carrier, a Wi-Fi provider, a device manufacturer, a model number, an IP address, a browser history, and a location, may be stored and associated with the verification identifier in database 800 or in another storage location. Subsequently when a request for a Unified ID from a device with the same verification identifier is received by the host server, the previously saved data for the verification identifier can be mapped to the newly created Unified ID. It should be appreciated that data associated with different verification identifiers for the same device may be saved as a result of a number of different interactions between the host server and the device over time in advance of the creation of the Unified ID and that all of the saved information may be consolidated to the Unified ID upon the Unified ID's creation.

Embodiments may extend the linking concept discussed above to account for the presence of multiple browsers on a single requesting device where different browsers have a different Unified ID. For example, a single requesting device may include a stand-alone web browser such as Safari™ while also including multiple in-app or WebKit-based browsers provided by different apps on a user's device. As a non-limiting example, a user's device may include apps for Facebook™, Twitter™ and LinkedIn™ in addition to a stand-alone browser. Each of these browsers may separately interact with the host server resulting in the initial creation of four separate Unified IDs with a different ETag or other form of the Unified ID returned to each browser. It should be noted that this situation may also occur where, as a result of cost or resource constraints, verification identifiers cannot be verified in advance of the creation of a Unified ID resulting in the creation of multiple Unified IDs for a single device. In one embodiment, the separate Unified IDs and their associated data may be consolidated together after creation through a number of techniques. For example, the verification module or other code executing on the host server may continually or periodically examine the database and identify Unified IDs that share other verification identifiers to identify Unified IDs associated with the same device. Alternatively, probabilistic data may enable the verification module to determine that the Unified IDs that are created for each of the browsers belong to the same device and should be consolidated under the same Unified ID. In one example the verification module may examine and compare browser information accessible in each of the different browsers and determine that the Unified ID created for that browser belong to the same device based on similarities. Other examples of probabilistic identification include using Wi-Fi network data patterns or device fingerprinting to aid in the increased likelihood of accurately identifying a device. It should be appreciated that preferably, whenever deterministic identifiers such as a carrier ID or device ID are available, the Unified ID associated with the deterministic identifiers will be used or created instead of relying on the probabilistic data.

Stored data 820 may be associated with Unified ID 810 in database 800. Stored data 820 includes data received from the mobile or other requesting device (following verification of identity as discussed herein) and may indicate historical device activity. In one embodiment, this stored data may enable a specific sequence of data to be presented to the device from one or more sources over a period of time. For example, the first time the device loads a web page triggering verification by the host server, the device may be presented with a first set of data. A record of that first set of data being delivered may then be stored in stored data 820 as payload data to be associated with Unified ID 810. At a subsequent point of time where the device processes the same or a different web page triggering verification by the host server, the verification module on the host server may identify the device, check the stored data, note the previous presentment of the first set of data and therefore identify a second set of data to be presented to the device. It will be appreciated that this sequence can continue indefinitely for additional sets of data beyond the two described above. In this manner, an entire sequence of data can be presented over time and over multiple platforms to the device.

Certain web browsers running on a user's device may present a separate technical challenge in that they may operate differently depending on whether the domain of the host server is trusted by user's device. Typically trust is established with a device based on a user action accessing a particular URL indicating that the user intentionally went to the domain. In one embodiment, when the domain is not trusted, the browser may block the request for the Unified ID resulting in the establishment of a different Unified ID each time the user accesses the domain. However, once the domain of the host server becomes trusted the browser no longer blocks the request for the Unified ID at which point the host server can establish the chain of identifiers. Any data previously gathered under the separate domain identifiers may then be consolidated after the fact under the assigned Unified ID using techniques described herein.

In another embodiment, certain web browsers running on a user's device may not share cache across domains compared to other browsers that will share a Unified ID across domains as long as the Unified ID is coming from the host server. For browsers that are not designed to share cache across domains (hereafter "alternate browsers"), embodiments of the present invention may provide an alternate process for providing a Unified ID to the requesting browser. In one embodiment, the alternate browser executing the JavaScript code to request the Unified ID is directed to a designated common intermediary for handling regardless of domain. In one example, the alternate browser may be identified through an "if-then request" followed by the designated intermediary requesting the Unified ID on the alternate browser's behalf. The Unified ID may be returned as part of a JSON response to be stored in the requesting alternate browser's cache. This alternate approach contrasts, for example, with other browsers where JavaScript code being executed by the browser may directly request the Unified ID for each domain and receive the same one in Response (in one embodiment received as the same ETag for each domain), In one embodiment, a request to a host server for a Unified ID may include an advertising identifier. If the request also includes a carrier ID, an advertising identifier→carrier relation may be created in the database (or an existing advertising identifier entry in the database may be refreshed with a new header). The Unified ID may then be linked to the advertising identifier when a mobile web request originates from over the carrier network using for example a 3G/4G/LTE (radio) signal as opposed to using Wi-Fi.

In one embodiment, for a carrier network established Unified ID to remain 100% persistent, the following may occur in a pre-determined time window (such as 7 days):

1) an advertising identifier is received over the carrier network, and 2) an ETag is placed over the carrier network in response to a request received from a device using the carrier network signal; or 3) an ETag is generated and the browser cache is not cleared until 1 and 2 occur.

In one embodiment, only device identifiers that are guaranteed, persistent and unique to a single particular device are used. Philosophically, in the embodiment, an approach may be taken to either have a Unified ID that is verified and reliable or else to not use a Unified ID at all. Therefore, when a Unified ID is found to be in existence, it is considered verified and trusted. To build a large database of device information, the registration of each Unified ID requires the host server to see each user's device at least once and register each identifier in its database, with the total number of devices in the identified database being dependent on the host server having delivered the Unified ID code snippet to a single device. In this manner a large dataset of Unified IDs can be built to be used by 3rd parties, such as trusted partners to the host server, as a way to create data differentiation beyond editorial content. Ultimately, this enables the creation of a data collective with an extensive data set.

In one embodiment, the Unified ID may be used to provide sequential advertising. For example, the Unified ID maintained by the host server may be utilized to create a brand story that unfolds by delivering different advertisements in a specified sequential order potentially across multiple sites or multiple apps and potentially using multiple ad formats. Without the Unified ID described herein, it would be difficult to serve ads to particular devices in a specified order of A, B, C, D as it would be difficult to differentiate between different devices and ad requests from the same device.

Although much of the description contained herein has described embodiments using a single host server to create or match a Unified ID to a requesting device, it should be appreciated that the use of multiple host servers under the control of a single entity may also be employed within the scope of the present invention and that the multiple servers may be geographically separated. Further, as explained below, in some embodiments, multiple entities in possession of partial information regarding a requesting device may cooperate to match a Unified ID to a requesting device.

In one embodiment, a second degree matching process is performed by the host server and a second entity working together. The second degree matching process may be performed in a number of different ways. In one embodiment, a second entity may identify a user's device and may have additional stored information about the user's device. For example, the second entity may be a department store chain that, via a store app providing a loyalty card discount on a user's mobile device, has access to the user's mobile device ID, an advertising identifier or another verification identifier, and may have stored its own set of unique data about the mobile device/user. The second entity may share the verification identifiers of which it is aware with the host server. The verification module or other code executing on the host server may match the one or more verification identifiers to a Unified ID and, as a result of the matching, may provide an advertisement or other information to the second entity or directly to the mobile device, such as an installment of a multi-part advertisement. If the second entity also provides the information of which it is aware such as loyalty card transactions to the host server, a larger consolidated pool of information may be associated with the Unified ID which may be used to increase the relevance of information provided to the user's device.

In another example of second degree matching, a host server in possession of a Unified ID cross-referenced with one or more verification identifiers may supply the verification identifiers that it has associated with one or more Unified IDs and/or related stored information to a second entity. If the device ID or other verification identifier of which the second entity is aware is one of the verification identifiers provided by the host server, the second entity can combine information it has previously stored, such as information regarding the user's loyalty card transactions, with information provided by the host server to provide further information to the user's device. Alternatively, following a match of verification identifiers by the second entity, advertisements or other information can be delivered to the second entity and/or the mobile device by the host server. In a collaborative arrangement, in one embodiment, the host server and second entity may share some or all of their stored data related to the verification identifiers with each other, and, at least in the case of the host server, this larger group of information may be associated with a Unified ID.

Alternatively, the matching of verification identifiers may be performed without the host server and second entity sharing any other data with each other. However, if information is shared, the second degree matching process may lead to a more robust consolidated set of data that can be used to provide targeted information to the user's device.

In one embodiment, a beacon system in a retail or other facility may be employed to perform second degree matching. A module in an app on a user's device may be recognized by the beacon system and provide a device ID that may be matched by the facility to a known Unified ID using second degree matching. In beacon matching, a short range communication protocol such as Bluetooth™ or Wi-Fi signals are sent from specific points in a store (such as an aisle or checkout) that search for applicable compatible devices like a mobile phone. When the beacon opens communication with a device, the beacon gains access to a verification identifier such as an advertising identifier. The store can then associate proprietary data (such as shopping interests, purchases, etc.) to that device. In an offline or real-time exchange, that data can then be exchanged with the host server to associate the data with the Unified ID.

The second degree matching may also be provided via Bluetooth™ or other short-range communication protocols to enabled devices in other settings. For example, in one embodiment, a smart TV, cable box, climate control system, laptop/personal computer and/or other smart telecommunication device that transmits and receives short-range communication protocol signals may be paired with a mobile device. The mobile device, in certain circumstances, may be used to directly interact or manipulate the external device and exchange data. In such cases, a mobile device identifier such as an advertising identifier may be used to pair that data with the web-based Unified ID. For example, in the case of a smart TV, the Unified ID may be paired with user contextual behavior related to viewing habits and channel-related data as well as house location and other household data. The context of the associated data may change according to the type of device with which the phone is paired. The Unified ID may be synchronized through a mobile app and associated with the device's identifier. A transitive bind between the device data and the web-based Unified ID may be created using the carrier ID, another verification identifier or by any similar method of bridging the app-to-web gap. In one example, the transitive bind may be as follows: External short-range communication protocol-equipped device→mobile phone short-range communication protocol (in app)→device identifier (e.g. advertising identifier)→carrier ID (or other verification identifier)→Unified ID→(optionally) $2^{nd}$ party IDs.

In another embodiment, a retail downloadable application may allow a user to purchase a product via that application by logging into a user account. The checkout process may use an email address, home address or credit card all of which may be considered verification identifiers which can subsequently be used to transitively match the device to the Unified ID by themselves or in combination with an advertising identifier or other device identifier. The checkout process may use a credit card which can be considered a verification identifier that is mapped to a Unified ID by the host server and allows additional information to be provided by the second entity or the host server to the user based on data that has previously been associated with the Unified ID at the host server. Alternatively, the retail app may include an in-app browser with a Unified ID.

Figure 9A:
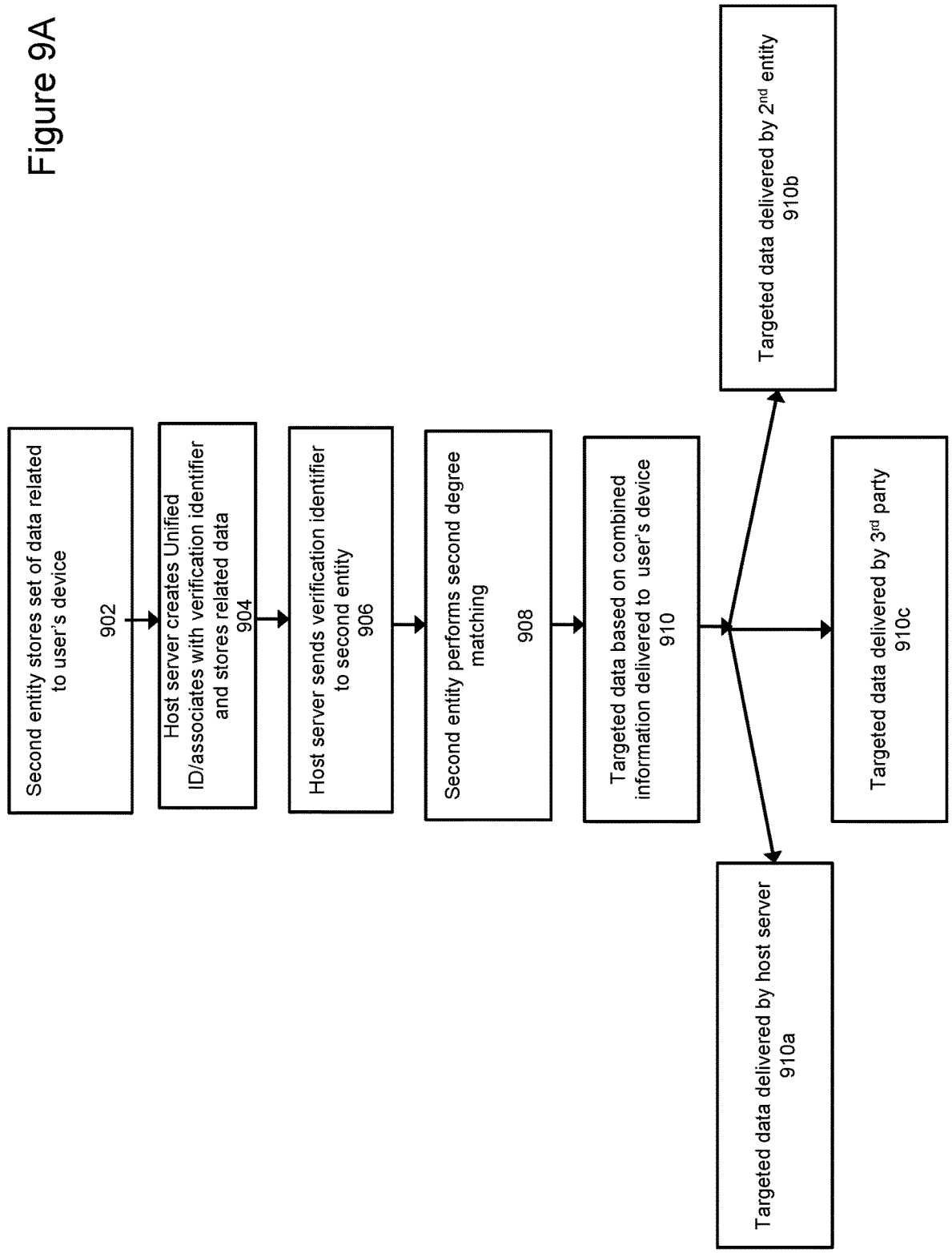
FIG. 9A depicts an exemplary sequence of steps executed to perform second degree matching in an embodiment of the present invention.

FIG. 9A depicts one exemplary sequence of steps executed to perform second degree matching in an embodiment of the present invention. The sequence begins with a second entity storing data related to a user's mobile or other computing device (step 902). For example, the second entity may be a department store (physical or online) recording transactions of a user made via an app on the user's smartphone. Further, as a result of the registration process of the app, the second entity may be in possession of one or more verification identifiers for the user's mobile device. Previously or subsequently to the second entity storing data related to the user's device (step 902), a separate host server may have created a Unified ID for the user's device and associated the Unified ID with one or more verification identifiers and set of data for the user's device (step 904). The host server may send the verification identifiers and optionally the set of data to the second entity (step 906) where second degree matching may be performed by the second entity (step 908). The second degree matching matches one or more verification identifiers of which the second entity is aware to the one or more verification identifiers of which the host server is aware. Once a verification identifier match has taken place, the set of data gathered by the second entity may be consolidated with the set of data previously associated with the Unified ID by the host server to create a more robust combined set of data. The consolidation of the data may take place at the second entity, at the host server or at another location. The larger set of data made up of the combined pools of information may be used to deliver targeted data such as sequential information to the user's device (step 910). The targeted data may be delivered by the host server (step 910a), the second entity (step 910b) or by a third party (step 910c) in electronic communication with at least one of the second entity and host server.

In an alternative embodiment, the host server may deliver additional information to the second entity or the user's device without associating additional information from the second entity with the Unified ID. This approach enables a matching and selection of advertising using the Unified ID without passing proprietary information between the host server and the second entity.

FIG. 9B depicts an alternate exemplary sequence of steps executed to perform second degree matching in an embodiment of the present invention. The sequence begins with a second entity storing data related to a user's mobile or other computing device (step 952). For example, the second entity may be a department store that has a beacon system in the store that connects with a user's smartphone, has a promotional application that a user downloads to his or her smartphone and/or potentially records transactions via an app on a user's smartphone. Further, as a result of the registration process of the app, the second entity may be in possession of one or more verification identifiers for the user's mobile device. Previously or subsequently to the second entity storing data related to the user's device (step 952), a separate host server may have created a Unified ID for the user's device and associated the Unified ID with one or more verification identifiers and set of data for the user's device (step 954). In this embodiment, the second entity sends its verification identifiers and optionally the associated stored data for the user's device to the host server (step 956) where second degree matching may be performed by the host server (step 958). The host server matches the one or more verification identifiers of which the second entity is aware to the one or more verification identifiers of which the host server is aware (and which are already associated with the Unified ID). Once a verification identifier match has taken place, the set of data gathered by the second entity may be consolidated with the set of data previously associated with the Unified ID by the host server to create a more robust combined set of data. The consolidation of the data may take place at the second entity, at the host server or at another location. The larger set of data made up of the combined pools of information may be used to deliver targeted data such as sequential information to the user's device (step 960). The targeted data may be delivered by the host server (step 960*a*), the second entity (step 960*b*) or by a third party (step 960*c*) in electronic communication with at least one of the second entity and host server.

It should be appreciated that other techniques for performing second degree matching not specifically described in FIGS. 9A and 9B are also within the scope of the present invention.

It should further be appreciated that the concepts enabling second degree matching may also be extended to perform third degree matching involving a $3^{rd}$ party. For example, instead of the host server providing verification identifiers and optionally data to a second entity directly such as a retail entity, the verification identifiers and optionally data could be provided to a $3^{rd}$ party which has a data connection with the host server and the retail entity. Upon receiving verification identifiers and optionally the associated data from the second entity, the $3^{rd}$ party could then attempt to match the verification identifiers received from the host server and second entity so that the respective sets of data can be consolidated to the Unified ID. Like second degree matching, this third degree matching sequence may create a larger set of data that may be mined to deliver targeted messages to the user's device. It will be appreciated that additional entities could also provide additional sets of data to the $3^{rd}$ party for matching to create an even larger set of data consolidated under the Unified ID.

FIG. 10A depicts an exemplary sequence of steps executed to perform third degree matching in an embodiment of the present invention. The sequence begins with a host server sending verification identifiers associated with a Unified ID and optionally data to a $3^{rd}$ party (step 1002). A second entity such as a retail entity also sends one or more verification identifiers and optionally associated data to the third party (step 1004). The third party performs matching of the verification identifiers (step 1006) and upon matching may consolidate the data received from both the second entity and the host server by associating it with the Unified ID. Targeted data may then be delivered to the user's device (step 1008). This targeted data may be based on a consolidated pool of data or may be transmitted without first consolidating data. The targeted data may be delivered by the third party performing the matching (step 1008*a*), by the host server (step 1008*b*), by the second entity (step 1008*c*) or by another entity (not pictured) in communication with the third party, host server and/or the second entity.

In one embodiment, the third party may not receive the data associated with the Unified ID from the host server but only determine a match of verification identifiers provided by the host server and the second entity. Upon determining a match, the host server and second entity may be informed of the verification identifier match by the third party. Following notification, the host server and the second entity may further communicate with each other and arrange the consolidation of data sets under the Unified ID at either or both of the host server and second entity. In this embodiment, the data sets associated with the verification identifiers and the Unified ID would not need to be sent to the third party.

Figure 10B:
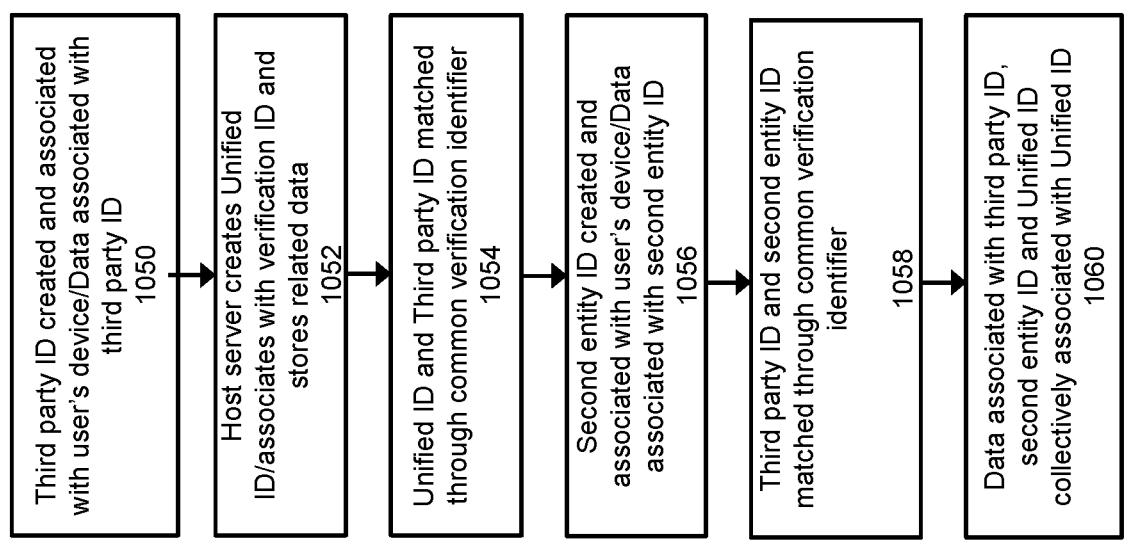
FIG. 10B depicts an exemplary sequence of steps executed to perform another type of third degree matching in an embodiment of the present invention.

It should be appreciated that other forms of third or larger degrees of matching performed to consolidate data under the Unified ID are also within the scope of the present invention. FIG. 10B depicts another exemplary sequence of steps executed to perform third degree matching in an embodiment of the present invention. The sequence begins with a third party identifying a user's device via a verification identifier for the user's device and collecting data about the device's activity which is matched to a third party ID assigned by the third party (step 1050). The host server may independently identify the same user's device and associate the device and related data with a Unified ID (step 1052). As described above in the description of second degree matching, the host server's identification of the user device and the third party's identification of the user device may be matched by way of common verification identifiers associated with the respective third party ID and Unified ID (step 1054). Previously or subsequently to the matching of the third party ID and the Unified ID, a second entity may have also identified the user device, assigned an ID and associated its own pool of data with that ID (step 1056). The third party may independently match its third party ID of the user device with an identification of the user device provided by a second entity through the use of common verification identifiers (step 1058). Accordingly, when the host server communicates with the second entity, the third party ID, which has previously been separately associated with the Unified ID and the second entity ID, may, through the transitive property, serve as a means to link the data from the host server, third party and second entity together as a combined pool of data linked to the Unified ID (step 1060).

Figure 11:
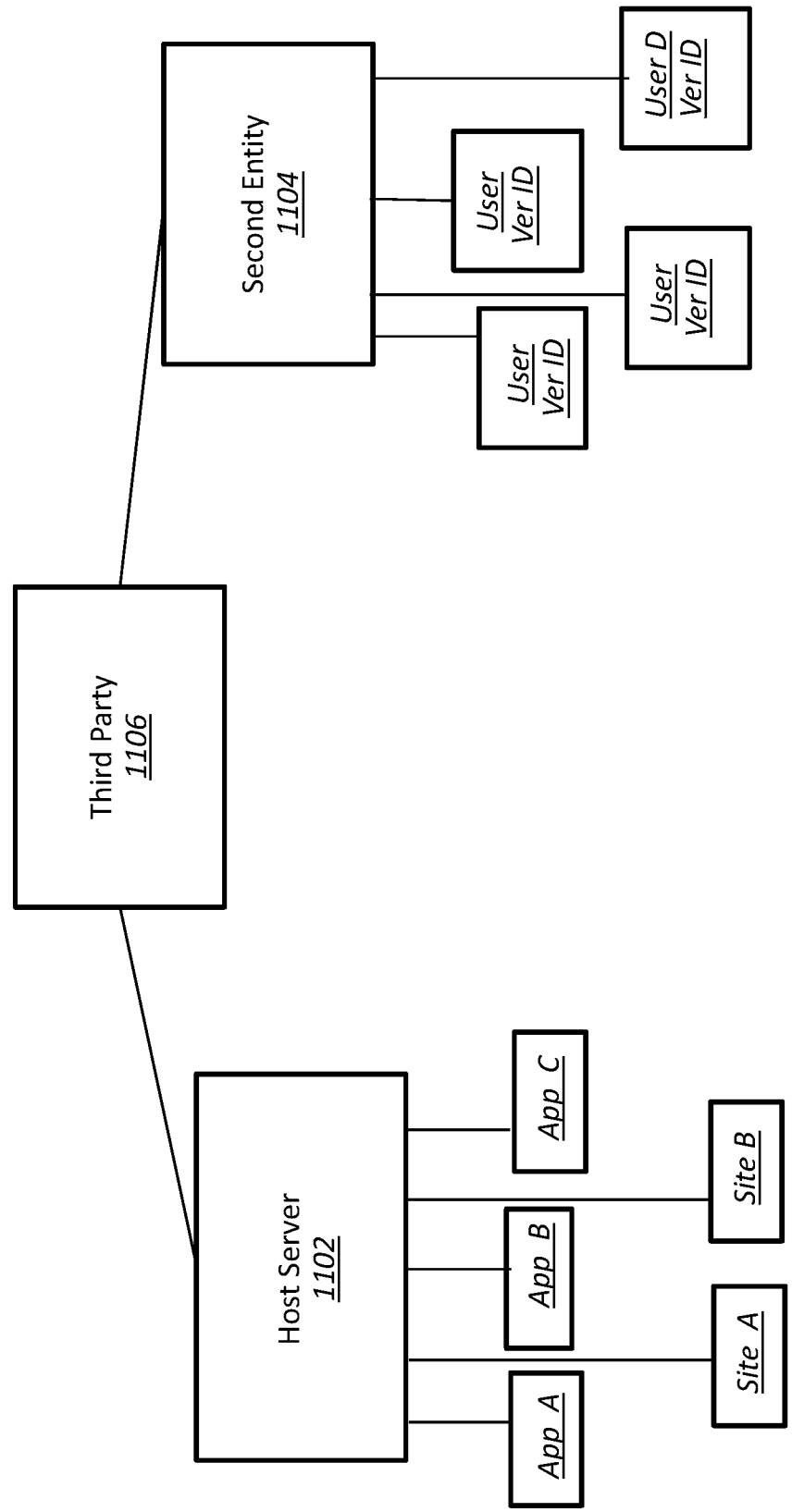
FIG. 11 depicts logical linking concepts that may be provided by an exemplary embodiment when using $2^{nd}$ and 3rd degree matching.

FIG. 11 depicts the logical linking concepts that may be provided by an exemplary embodiment when using $2^{nd}$ and 3rd degree matching. A host server 1102 may be used to establish a Unified ID based on device requests made through different apps and domains resulting in the host server possessing a first data set. A second entity 1104, such as a retail site may independently form its own data set tied to its own identifier and that relies on a number of additional types of verification identifiers from its customers. A third party 1106 may similarly generate a third party ID tied to verification identifiers from the user's device. Through the transitive property the disparate collections of data collected by the host server 1102, the second entity 1104 and the third party 1106 may be linked via common verification identifiers without the need to share proprietary data between the host server and the second entity. The third party matching allows the collective data sets to be utilized to better identify and serve the right information to the right device. It will be appreciated that where the third party has previously matched verification identifiers with one or more additional entities the matching process between the host server and the third party provides scalability extending the benefits of the Unified ID to encompass the multiple entities previously matched with the third party.

It should be appreciated that additional techniques for performing second and third degree matching consistent in spirit with those specifically discussed herein are also within the scope of the present invention and that embodiments discussed herein should be considered as illustrative and not limiting.

Although the description herein of some of the embodiments describes a mobile device as the device requesting a Unified ID, it should be appreciated that in alternate embodiments non-mobile computing devices may submit the request and that the host server and second and additional entities as discussed herein may also handle such requests from non-mobile devices.

It should be appreciated that embodiments of the present invention as described herein address a technical problem inherent in the use of mobile and other devices in today's interconnected world. Mobile devices, by their very nature, connect to the Internet from different locations and using different communication protocols. The mobility of mobile devices makes reliance on probabilistic techniques for device identification such as tracking an IP address from which a request originates a sub-optimal approach to device identification. Further, for both mobile and non-mobile devices, reliance on strictly client-side conventional techniques such as cookies or other techniques is problematic for network-based content providers as a means to identify a particular device since the maintenance of the client-side identifier is outside of their control. As described herein, embodiments provide a technique for mobile and other device identification that is more deterministic, more resilient and not subject to the inherent uncertainty associated with strictly probabilistic or strictly client-side techniques. Further, embodiments enable the formation of a consolidated pool of data collected from multiple entities that may be associated with a Unified ID to enable a targeted delivery of data of increased relevance to a user's device.

Although the system described herein for improved device identification provides, in many circumstances, a deterministic approach for mobile and other device identification, in other circumstances the requesting device may not be able to determine the identity of the requesting device with 100% certainty. For example, when mobile carrier data is not available, and the Unified ID on the device cannot be verified as valid (such as is the case of devices with temporary identifiers), the verification module may resort to an alternative approach such as a probabilistic or statistical approach. In such situations a hybrid approach to associate data with an existing Unified ID may be employed by an embodiment of the present invention to supplement the deterministic techniques described above with a conventional probabilistic approach, such as identifying an IP address of the requesting device, or by comparing browser information on the user's device, or with a statistical approach. Although such an identification is not completely deterministic, it is partially deterministic as some of the data in the combined pool of data is definitively associated with a Unified ID for the device (through the use of a verification identifier). Thus even such a hybrid scenario represents an improvement of accuracy in device identification and the gathering of associated data based on the identification when compared to conventional probabilistic or statistical techniques for identifying devices.

In one embodiment, the host server may have access to contextual data about the browsing habits of users that view advertisements provided by the host server. For example, based on the stored data it may be possible to know that someone using the mobile device visits CNN every morning, at the same time, in the same location. Additionally, in another embodiment, technical patterns may be examined by the verification module, such as technical information that the device shares, to further "fingerprint" a device. In other embodiments, data gleaned from the device communication with the JavaScript code and requested data can be used to create a probabilistic graph of devices. In this manner, a set of data that is not absolutely certain to be associated with a user's device may nevertheless be combined with data already associated with the Unified ID through the use of a verification identifier as described above.

Similarly, in another embodiment, to identify a device, a statistical approach may be employed. For example, the verification module may start with a group of devices, then cluster those devices into subgroups of devices that likely match. Factors such as IP address, device type, browser version release, number of apps, contextual behavior and other device information may be continuously used by the verification module to narrow down a large array of potential device identities down to a smaller group, until the verification module has some pre-specified degree of certainty that one device is more probably associated with the Unified ID than the others.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A method for improved identification of a mobile device, comprising:
   identifying a unique first verification identifier for a mobile device at a host server;
   creating a unified identifier ("Unified ID") for the mobile device at the host server;
   storing the identified first verification identifier and the Unified ID in a storage location, the stored first verification identifier associated with the stored Unified ID in the storage location;
   receiving one or more verification identifiers and one or more associated sets of data at the host server, the one or more verification identifiers identified by a second entity;
   matching the unique first verification identifier or another verification identifier associated with the Unified ID with the one or more verification identifiers received from the second entity; and
   performing, based on the matching, at least one of an action related to the Unified ID and an association of one of the one or more associated sets of data received from the second entity with the Unified ID.

2. The method of claim 1, further comprising:
   associating, at the host server, a data payload received from the mobile device with the Unified ID.

3. The method of claim 1, further comprising:
receiving a subsequent request at the host server from the mobile device, the subsequent request not accompanied by the Unified ID;
verifying the Unified ID for the mobile device using the stored first verification identifier; and
associating, at the host server, based on the verifying, a data payload with the Unified ID, the data payload received from the mobile device.

4. The method of claim 1, further comprising:
identifying a plurality of different types of unique verification identifiers for the mobile device; and
storing and associating each of the plurality of different types of unique verification identifiers for the mobile device with the stored Unified ID in the storage location.

5. The method of claim 4 wherein the plurality of different types of unique verification identifiers include at least two of a carrier ID, device ID, SIM card address, cookie, Ethernet card address, and advertising identifier.

6. The method of claim 4, further comprising:
receiving a subsequent request at the host server from the mobile device, the subsequent request not accompanied by the Unified ID;
verifying the Unified ID for the mobile device using a second verification identifier from among the stored plurality of different types of unique verification identifiers associated with the stored Unified ID; and
associating, at the host server, a data payload with the Unified ID, the data payload received from the mobile device.

7. The method of claim 1, further comprising:
identifying a plurality of different unique verification identifiers for the mobile device; and
storing and associating each of the plurality of different unique verification identifiers for the mobile device with the stored Unified ID in the storage location, wherein the plurality of unique verification identifiers include at least two different cookies.

8. The method of claim 1, further comprising:
sending a targeted advertisement to the mobile device following an association of the one or associated sets of data with the Unified ID.

9. The method of claim 1, further comprising:
storing a first set of data and an association of the first set of data with the first verification identifier prior to the creation of the Unified ID; and
associating the first set of data with the Unified ID after the creation of the Unified ID based on the first verification identifier.

10. A non-transitory medium holding computer-executable instructions for improved identification of a mobile device, the instructions when executed causing at least one computing device to:
identify a unique first verification identifier for a mobile device at a host server;
create a unified identifier ("Unified ID") for the mobile device at the host server;
store the identified first verification identifier and the Unified ID in a storage location, the stored first verification identifier associated with the stored Unified ID in the storage location;
receive one or more verification identifiers and one or more associated sets of data at the host server, the one or more verification identifiers identified by a second entity;
match the unique first verification identifier or another verification identifier associated with the Unified ID with the one or more verification identifiers received from the second entity; and
perform, based on the matching, at least one of an action related to the Unified ID and an association of one of the one or more associated sets of data received from the second entity with the Unified ID.

11. The medium of claim 10, wherein the instructions when executed further cause the at least one computing device to:
associate, at the host server, a data payload received from the mobile device with the Unified ID.

12. The medium of claim 10, wherein the instructions when executed further cause the at least one computing device to:
receive a subsequent request at the host server from the mobile device, the subsequent request not accompanied by the Unified ID;
verify the Unified ID for the mobile device using the stored first verification identifier; and
associate, at the host server, based on the verifying, a data payload with the Unified ID, the data payload received from the mobile device.

13. The medium of claim 10, wherein the instructions when executed further cause the at least one computing device to:
identify a plurality of different types of unique verification identifiers for the mobile device; and
store and associate each of the plurality of different types of unique verification identifiers for the mobile device with the stored Unified ID in the storage location.

14. The medium of claim 13, wherein the plurality of different types of unique verification identifiers include at least two of a carrier ID, device ID, SIM card address, cookie, Ethernet card address, and advertising identifier.

15. The medium of claim 13, wherein the instructions when executed further cause the at least one computing device to:
receive a subsequent request at the host server from the mobile device, the subsequent request not accompanied by the Unified ID;
verify the Unified ID for the mobile device using a second verification identifier from among the stored plurality of different types of unique verification identifiers associated with the stored Unified ID; and
associate, at the host server, a data payload with the Unified ID, the data payload received from the mobile device.

16. The medium of claim 10, wherein the instructions when executed further cause the at least one computing device to:
identify a plurality of different unique verification identifiers for the mobile device; and
store and associate each of the plurality of different unique verification identifiers for the mobile device with the stored Unified ID in the storage location, wherein the plurality of unique verification identifiers include at least two different cookies.

17. The medium of claim 10, wherein the instructions when executed further cause the at least one computing device to:
send a targeted advertisement to the mobile device following an association of the one or associated sets of data with the Unified ID.

18. A computing device configured for improved identification of a mobile device, comprising:
- a communication interface configured to receive over a network requests originating from a mobile device; and
- a processor configured to execute instructions for a verification module, the verification module when executing causing the computing device to:
  - identify a unique first verification identifier for a mobile device at a host server;
  - create a unified identifier ("Unified ID") for the mobile device at the host server;
  - store the identified first verification identifier and the Unified ID in a storage location, the stored first verification identifier associated with the stored Unified ID in the storage location;
  - receive one or more verification identifiers and one or more associated sets of data at the host server, the one or more verification identifiers identified by a second entity;
  - match the unique first verification identifier or another verification identifier associated with the Unified ID with the one or more verification identifiers received from the second entity; and
  - perform, based on the matching, at least one of an action related to the Unified ID and an association of one of the one or more associated sets of data received from the second entity with the Unified ID.

19. The computing device of claim 18, wherein the verification module when executed further causes the computing device to:
- identify a plurality of different types of unique verification identifiers for the mobile device; and
- store and associate each of the plurality of different types of unique verification identifiers for the mobile device with the stored Unified ID in the storage location.

20. The computing device of claim 18, wherein the plurality of different types of unique verification identifiers include at least two of a carrier ID, device ID, SIM card address, cookie, Ethernet card address, and advertising identifier.

* * * * *